(12) United States Patent
Norman et al.

(10) Patent No.: US 6,500,253 B2
(45) Date of Patent: Dec. 31, 2002

(54) AGGLOMERATION OF HYDRAULIC CEMENT POWDER

(75) Inventors: Lewis R. Norman, Duncan, OK (US); Richard Turton, Morgantown, WV (US); Huma Hakim, Morgantown, WV (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/741,445

(22) Filed: Dec. 18, 2000

(65) Prior Publication Data

US 2002/0117088 A1 Aug. 29, 2002

(51) Int. Cl.$^7$ ................................................ C04B 34/10
(52) U.S. Cl. ........................ 106/726; 106/730; 106/753; 106/805
(58) Field of Search ................................ 106/726, 753, 106/785, 730, 805

(56) References Cited

U.S. PATENT DOCUMENTS 5,454,867 A    10/1995  Brothers et al. ............ 106/724

OTHER PUBLICATIONS

Paper entitled "Agglomeration of Cement to Facilitate Transportation" by Richard Turton, Huma Hakim, Alfred Stiller and Lewis R. Norman, presented Nov. 2000.

Primary Examiner—Paul Marcantoni
(74) Attorney, Agent, or Firm—Craig W. Roddy; C. Clark Dougherty, Jr.

(57) ABSTRACT

Methods of agglomerating hydraulic cement powder to improve its flow and handling characteristics are provided. One embodiment of the methods of the present invention is comprised of the steps of forming a mixture of the hydraulic cement powder with a particulate solid disintegrating agent, the disintegrating agent having the property of causing the break up of the agglomerated cement powder upon contact with water. Thereafter, the mixture is compressed into agglomerated pellets.

23 Claims, No Drawings

AGGLOMERATION OF HYDRAULIC CEMENT POWDER

BACKGROUND OF THE INVENTION

1. Field of the Invention

The present invention relates to methods of agglomerating hydraulic cement powder to improve the flow and handling characteristics of the cement.

2. Description of the Prior Art

Hydraulic cement powder is utilized to prepare cement slurries which are in turn used to form hard cement masses in a variety of construction applications. The hydraulic cement powder is generally conveyed by pneumatic conveyors due to its fine powdery nature. In addition to the small particle size of hydraulic cement powder, i.e., particles in the range of from about 15 microns to about 40 microns, the cement particles are cohesive in nature and resist flow. As a result of the resistance to flow of hydraulic cement powder, a variety of problems in pneumatically conveying the powder arise. For example, the cement particles tend to pack together and resist flow. This condition is worsened by the presence of moisture and results in reduced dry cement flow rates, the unsteady delivery of the cement powder to cement mixing devices, the occurrence of dusting at the mixing devices and the undesirable retention of significant amounts of packed cement powder in cement storage containers.

As a result of the very small particle size of the hydraulic cement powder and its formation of dust, respiratory problems are often caused in personnel breathing the dust. Cement particles less than about 10 microns in size are inhaled deeply into the lungs and are classified as a respiratory dust hazard.

While various methods of agglomerating hydraulic cement powder have been proposed heretofore, such methods have generally been very costly to implement or otherwise unsuccessful.

Thus, there are continuing needs for simple and economical methods of agglomerating hydraulic cement powder into larger diameter pellets or granules to improve the flow and handling characteristics of the hydraulic cement powder. The larger cement particle sizes reduce packing in storage tanks and eliminate problems associated with the transportation of the hydraulic cement powder.

SUMMARY OF THE INVENTION

The present invention provides methods of agglomerating hydraulic cement powder to improve its flow and handling characteristics which meet the needs described above and overcome the deficiencies of the prior art. In one embodiment of the invention, a method of agglomerating hydraulic cement powder is provided comprising the following steps. The hydraulic cement powder is mixed with a particulate solid disintegrating agent having the property of causing the break-up of agglomerated cement powder upon contact with water. The mixture of hydraulic cement powder and the particulate solid disintegrating agent is then compressed into agglomerated pellets. The agglomerated pellets preferably have a size in the range of from about 1 millimeter to about 10 millimeters in diameter, and when they are mixed with water the disintegrating agent swells or otherwise causes the pellets to break-up into powder form.

In another embodiment of the present invention, a particulate solid, water soluble, hydraulic cement slurry set accelerating agent and a particulate solid, water soluble, hydraulic cement slurry set retarding agent are mixed with a volatile non-aqueous solvent to form a binder solution thereof. The binder solution is then mixed with the hydraulic cement powder in a mixing apparatus whereby the binder solution is distributed onto surfaces of the hydraulic cement powder, the volatile non-aqueous solvent is evaporated and the cement powder is granulated to a selected size in the range of from about 1 millimeter to about 10 millimeters in diameter. Upon mixing and vigorously agitating the granulated hydraulic cement with water, the solid binder formed of the accelerating agent and the retarding agent dissolves thereby allowing the hydraulic cement to revert to a powder.

Thus, it is an object of the present invention to provide improved methods of agglomerating hydraulic cement powder to improve the flow and handling characteristics of the cement.

Other and further objects, features and advantages of the present invention will be readily apparent to those skilled in the art upon a reading of the description of preferred embodiments which follows.

DESCRIPTION OF PREFERRED EMBODIMENTS

Hydraulic cement powder is generally transported into and out of storage tanks by pneumatic conveyors. In some instances, it would be more convenient to convey the hydraulic cement powder by mechanical conveyors or other means, but due to the fine powdery nature of the hydraulic cement, mechanical conveyors and the like can not be utilized.

When hydraulic cement powder is stored in storage tanks which are subject to vibration, e.g., truck or ship mounted storage tanks, the hydraulic cement powder becomes compacted in the storage tanks and because the powder is cohesive in nature, it is difficult to remove the hydraulic cement powder from the storage tanks. Often, a substantial portion of the hydraulic cement powder is left in the storage tanks which constitutes an economic loss, and the compacted cement powder must subsequently be removed and reused or disposed of. As mentioned above, hydraulic cement powder can cause respiratory problems in personnel that breathe the powder while conveying and otherwise working with it.

In accordance with the present invention, simple and economical methods of agglomerating hydraulic cement powder to improve its flow and handling characteristics are provided. In accordance with the present invention, the hydraulic cement powder is formed into pellets or granules which when mixed with water revert to powder and form cement slurries which have substantially the same properties as a cement slurry formed directly with the hydraulic cement powder. That is, the cement slurries formed with the pellets or granules of the present invention have substantially the same viscosities, water contents, compressive strengths and other properties before and after setting as conventional slurries formed with cement powder.

In a first embodiment of this invention, hydraulic cement powder is agglomerated by first forming a mixture of the hydraulic cement powder with a particulate solid disintegrating agent. The disintegrating agent has the property of causing the disintegration of agglomerated cement powder upon contact with water. After the mixture of hydraulic cement powder and disintegrating agent is formed, the mixture is compressed into pellets utilizing a conventional pellet forming press or the like. When the pellets are mixed with water, the disintegrating agent therein swells or otherwise causes the pellets to revert to powder form.

The pellets formed are generally of a size in the range of from about 1 millimeter to about 10 millimeters in diameter and they are readily conveyable in either pneumatic or mechanical conveying apparatus without forming hydraulic cement dust. Further, when stored in storage tanks, the pellets do not compact and are readily removable from the storage tanks.

Examples of particulate solid disintegrating agents which can be utilized in accordance with this invention include, but are not limited to, microcrystalline cellulose, hydroxy ethyl cellulose and hydroxypropyl methyl cellulose. Of these, microcrystalline cellulose is preferred. A suitable microcrystalline cellulose is commercially available from FMC Corporation under the trade designation "AVICEL™." Microcrystalline cellulose immediately swells when contacted with water and thereby causes the hydraulic cement pellets to disintegrate back into powder. The particulate solid disintegrating agent is mixed with the hydraulic cement powder in a general amount in the range of from about 0.5% to about 5% by weight of the hydraulic cement powder in the mixture.

Examples of hydraulic cement powders which can be utilized in accordance with this invention include, but are not limited to, Portland cements, slag cements, pozzolana cements, gypsum cements, high alumina content cements and high alkalinity cements. Of these, Portland cements are preferred.

Another embodiment of this invention for agglomerating hydraulic cement powder to improve its flow and handling characteristics is comprised of the following steps. A particulate solid, water soluble, hydraulic cement slurry set accelerating agent and a particulate solid, water soluble hydraulic cement slurry set retarding agent are mixed with a volatile non-aqueous solvent to form a binder solution thereof. The binder solution is then mixed with the hydraulic cement powder in a mixing apparatus whereby the binder solution is distributed onto the surfaces of the hydraulic cement powder, the volatile non-aqueous solvent is evaporated and the cement powder is granulated to a selected size.

A variety of mixing apparatus for accomplishing the mixing of the binder solution and hydraulic cement powder, the vaporization of the non-aqueous solvent and the granulation of the cement powder can be utilized. Examples of such apparatus include, but are not limited to, rotary drums, rotary pans, high shear mixers and fluidized beds. The binder solution is pumped or otherwise introduced into the mixing apparatus whereby it mixes with the hydraulic cement powder and forms wet agglomerates. The mixing apparatus is operated at a temperature, such as by introducing a heated inert fluidizing gas therein, whereby the binder solvent is evaporated which causes the particulate solid set accelerator and set retarder to be deposited on the cement powder and to form dry agglomerates. The amount of shear applied to the dry agglomerates during the mixing process determines the size of the granules produced. Generally, granules are produced in the size range of from about 1 millimeter to about 10 millimeters in diameter.

The ratio of the amount of the cement slurry set accelerating agent to the amount of the cement slurry set retarding agent in the binder solution is generally adjusted so that that the granules produced do not form either a substantially set accelerated cement slurry or a substantially set retarded cement slurry when mixed with water. However, as will be understood by those skilled in the art, the ratio of the cement slurry set accelerating agent to the cement slurry set retarding agent can be adjusted to produce granules which form a cement slurry that is either set accelerated or set retarded when mixed with water.

A variety of particulate solid, water soluble, hydraulic cement slurry set accelerating agents can be utilized in accordance with this invention. Examples of such cement slurry set accelerating agents include, but are not limited to, calcium chloride, sodium chloride, sodium silicate and gypsum. Of these, calcium chloride is preferred.

A variety of particulate solid, water soluble, hydraulic cement slurry set retarding agents can also be utilized. Examples of suitable such cement slurry set retarding agents include, but are not limited to, tartaric acid, fructose, hydroxy propyl methyl cellulose and calcium lignosulfate. Of these, tartaric acid is preferred.

When a calcium chloride cement slurry set accelerating agent and a tartaric acid cement slurry set retarding agent are utilized in the binder solution, and it is desired that the granules produced do not form either a substantially set accelerated nor substantially set retarded cement slurry when mixed with water, the ratio of the amount of cement slurry set accelerating agent to the amount of the cement slurry set retarding agent in the binder solution is in the range of from about 1.5:0.3 to about 1.5:0.4.

A variety of volatile, non-aqueous solvents can also be utilized. Examples of such non-aqueous volatile solvents include, but are not limited to, methanol, acetone, ethanol and methyl ethyl ketone. The amount of the volatile, non-aqueous solvent utilized is an amount sufficient to dissolve the particulate solid set accelerating agent and set retarding agent and to achieve granulation. Generally the amount of solvent utilized by weight is in the range of from about 10 to about 20 times the weight of the particulate solid set accelerating and retarding agents dissolved therein. Stated another way, the dissolved set accelerating and retarding agents or generally dissolved in the solvent in an amount in the range of from about 1% to about 3% by weight of the hydraulic cement to be agglomerated.

The binder solution is mixed with the hydraulic cement powder in an amount generally in the range of from about 15% to about 25% by weight of the hydraulic cement powder. The hydraulic cement powder can be any of the hydraulic cements described above and is preferably Portland cement.

A particularly suitable method of the above described second embodiment of this invention for agglomerating hydraulic cement powder and to thereby improve its flow and handling characteristics comprises the following steps. Mixing a particulate solid, water soluble, hydraulic cement slurry set accelerating agent comprised of calcium chloride and a particulate solid, water soluble, hydraulic cement slurry set retarding agent comprised of tartaric acid with a volatile non-aqueous solvent comprised of methanol to form a binder solution thereof. The binder solution is mixed with the hydraulic cement powder in a mixing apparatus whereby the binder solution is distributed onto surfaces of the hydraulic cement powder, the volatile, non-aqueous solvent is evaporated and the cement powder is granulated to a selected size in the range of from about 1 millimeter to about 10 millimeters in diameter.

The methanol binder solution formed preferably contains a weight ratio of the calcium chloride set accelerating agent to the tartaric acid set retarding agent of 1.5:0.35, and the methanol binder solution is mixed with the hydraulic cement powder in an amount in the range of from about 15% to about 25% by weight of the hydraulic cement powder.

In order to further illustrate the methods of this invention, the following examples are given.

EXAMPLE 1

API Class H Portland cement powder was mixed with a disintegrating agent, i.e., microcrystalline cellulose. The disintegrating agent was present in the mixture in an amount of 5% by weight of the cement powder. The mixture was formed into pellets (also referred to as tablets) using a conventional press which formed the pellets by compression. Five of the pellets were weighed, placed in a closed sieve and were shaken therein for 15 minutes. Thereafter, the pellets were again weighed to determine the weight percent of material lost due to attrition. The result of this test indicated that only 0.474% of the material making up the pellets was lost.

EXAMPLE 2

Pellets produced as described in Example 1 were placed in fresh water. Upon contact with the water, the disintegrating agent in the pellets swelled which in turn caused the pellets to break into powder. The pellets broke within a few seconds and the resulting powder dispersed in the water within a time period of 1 to 2 minutes.

EXAMPLE 3

Ten cement slurries were prepared utilizing non-agglomerated API Class H Portland cement powder and fresh water. The slurries contained fresh water in an amount of about 38% by weight of cement in the slurries.

Portions of each slurry were placed in six bronze cubical molds, placed in a hot water bath at a temperature of 100° F and allowed to set for 72 hours. The set portions were then tested for compressive strength in accordance with the procedure set forth in the *API Specification for Materials and Testing for Well Cements*, API Specification 10, 5$^{th}$ Edition, dated Jul. 1, 1990 of the American Petroleum Institute. The highest and lowest compressive strength values were discarded and the remaining four were averaged to give the mean compressive strength for each cement slurry tested. The mean value of compressive strength for the ten slurries tested was 19,500 lbf obtained at a loading rate of 170 psi/second.

API Class H Portland cement powder was agglomerated into granules in accordance with the present invention. That is, eight binder solutions were formed comprised of particulate solid, water soluble calcium chloride set accelerating agent and particulate solid, water soluble tartaric acid set retarding agent dissolved in methanol. The calcium chloride was included in the eight binder solutions in an amount equivalent to 1.5% by weight of the cement powder to be treated with the binder solutions. Different amounts of the tartaric acid were included in the eight binder solutions, i.e., amounts which varied between 0.25% to 0.45% by weight of the cement powder to be treated by the solutions.

The eight binder solutions were separately mixed with API Class H cement powder in a mixing apparatus wherein the binder solution was distributed onto the surfaces of the cement powder, the methanol in the binder solution was vaporized, the dissolved solids were deposited on the cement powder and the cement powder was granulated to a size of about 5 millimeters in diameter.

The eight portions of cement granules formed as described above were mixed with water whereby the resulting cement slurries contained water in an amount of about 38% by weight of cement in the slurries. The eight cement slurries formed were tested for compressive strength in the same manner as described above for the non-agglomerated cement slurries. The set cement slurry samples were subjected to loading rates of 170 psi per second.

The mean compressive strength value for the set non-agglomerated cement slurries and the compressive strength values of the eight set cement slurries formed with the eight portions of agglomerated (granulated) cement having different amounts of tartaric acid in the binder solutions utilized are shown in the Table below.

TABLE

Comparison of Compressive Strengths of Set Agglomerated (Granulated) Cement Slurries And Set Non-Agglomerated Cement Slurries

| Amount of Tartaric Acid in Binder Solution Used to Form Granulated Cement, % by wt. of Cement Powder Granulated[1] | Compressive Strenghts of Set Granulated Cement Slurries, lbf | Mean Compressive Strengths of Non-Agglomerated Cement Slurries, lbf |
|---|---|---|
| 0.25 | 26,000 | 19,500 |
| 0.275 | 23,000 | 19,500 |
| 0.30 | 21,500 | 19,500 |
| 0.30 | 18,000 | 19,500 |
| 0.325 | 23,000 | 19,500 |
| 0.325 | 21,500 | 19,500 |
| 0.35 | 15,000 | 19,500 |
| 0.45 | 1,000 | 19,500 |

[1]All binder solutions contained 1.5 wt. % calcium chloride

Referring to Table I, it can be seen that at tartaric acid weight percentages less than about 0.35%, the compressive strength values for granulated cement are greater than those for non-agglomerated cement. For weight percentages greater than 0.35%, the opposite trend was observed. Thus, set cement slurries formed with the granulated cement of this invention have compressive strength properties which can be equal to, greater than or less than non-agglomerated cement powder depending on the amount of tartaric acid used.

Thus, the present invention is well adapted to carry out the objects and attain the features and advantages mentioned as well as those which are inherent therein. While numerous changes may be made by those skilled in the art, such changes are encompassed within the spirit of this invention as defined by the appended claims.

What is claimed is:

1. A method of agglomerating hydraulic cement powder to improve its flow and handling characteristics comprising the steps of:
    (a) forming a mixture of said hydraulic cement powder with a particulate solid disintegrating agent, said disintegrating agent having the property of causing the break up of agglomerated cement powder upon contact with water; and
    (b) compressing said mixture formed in step (a) into pellets.

2. The method of claim 1 wherein said particulate solid disintegrating agent is selected from the group consisting of microcrystalline cellulose, hydroxy ethyl cellulose and hydroxypropyl methyl cellulose.

3. The method of claim 1 wherein said solid particulate disintegrating agent is microcrystalline cellulose.

4. The method of claim 1 wherein said particulate solid disintegrating agent is present in said mixture formed in step (a) in an amount in the range of from about 0.5% to about 5% by weight of said cement powder in said mixture.

5. The method of claim 1 wherein said hydraulic cement powder is selected from the group consisting of Portland cements, slag cements, pozzolana cements, gypsum cements, high alumina content cements and high alkalinity cements.

6. The method of claim 1 wherein said hydraulic cement powder is Portland cement.

7. The method of claim 1 wherein said agglomerated pellets have a size in the range of from about 1 millimeter to about 10 millimeters in diameter.

8. A method of agglomerating hydraulic cement powder to improve its flow and handling characteristics comprising the steps of:

(a) mixing a particulate solid, water soluble, hydraulic cement slurry set accelerating agent and a particulate solid, water soluble, hydraulic cement slurry set retarding agent with a volatile non-aqueous solvent to form a binder solution thereof; and (b) mixing the binder solution formed in step (a) with said hydraulic cement powder in a mixing apparatus whereby said binder solution is distributed onto surfaces of said hydraulic cement powder, said volatile non-aqueous solvent is evaporated and said hydraulic cement powder is granulated.

9. The method of claim 8 wherein the ratio of the amount of said hydraulic cement slurry set accelerating agent to the amount of said hydraulic cement slurry set retarding agent in said solution formed in step (a) is such that the hydraulic cement granules produced in accordance with step (b) do not form either a substantially set accelerated cement slurry or a substantially set retarded cement slurry when said granules are mixed with water.

10. The method of claim 8 wherein said hydraulic cement slurry set accelerating agent is selected from the group consisting of calcium chloride, sodium chloride, sodium silicate and gypsum.

11. The method of claim 8 wherein said hydraulic cement slurry set retarding agent is selected from the group consisting of tartaric acid, fructose, hydroxy propyl methyl cellulose and calcium lignosulfate.

12. The method of claim 8 wherein said volatile non-aqueous solvent is selected from the group consisting of methanol, ethanol, acetone and methyl ethyl ketone.

13. The method of claim 8 wherein said solution formed in step (a) is mixed with said hydraulic cement powder in accordance with step (b) in an amount in the range of from about 15% to about 25% by weight of said hydraulic cement powder.

14. The method of claim 8 wherein said cement powder is granulated to a selected size in the range of from about 1 millimeter to about 10 millimeters in diameter.

15. The method of claim 8 wherein said hydraulic cement powder is selected from the group consisting of Portland cements, slag cements, pozzolana cements, gypsum cements, high alumina content cements and high alkalinity cements.

16. The method of claim 8 wherein said hydraulic cement powder is Portland cement.

17. A method of agglomerating hydraulic cement powder to improve its flow and handling characteristics comprising the steps of:

(a) mixing a particulate solid, water soluble, hydraulic cement slurry set accelerating agent comprising calcium chloride and a particulate solid, water soluble, hydraulic cement slurry set retarding agent comprising tartaric acid with a volatile non-aqueous solvent to form a solution thereof; and (b) mixing the solution formed in step (a) with said hydraulic cement powder in a mixing apparatus whereby said solution is distributed onto surfaces of said hydraulic cement powder, said volatile non-aqueous solvent is evaporated and said cement powder is granulated to a selected size in the range of from about 1 millimeter to about 10 millimeters in diameter.

18. The method of claim 17 wherein the weight ratio of the amount of said hydraulic cement slurry set accelerating agent to the amount of said hydraulic cement slurry set retarding agent in said solution formed in step (a) is in the range of from about 1.5:0.3 to about 1.5:0.4.

19. The method of claim 17 wherein said volatile non-aqueous solvent is methanol.

20. The method of claim 17 wherein said solution formed in step (a) is mixed with said hydraulic cement powder in accordance with step (b) in an amount in the range of from about 15% to about 25% by weight of said hydraulic cement powder.

21. The method of claim 17 wherein said hydraulic cement powder is selected from the group consisting of Portland cements, slag cements, pozzolana cements, gypsum cements, high alumina content cements and high alkalinity cements.

22. The method of claim 17 wherein said hydraulic cement powder is Portland cement.

23. The method of claim 15 wherein step (b) is carried out in a mixer apparatus selected from the group consisting of rotary drums, rotary pans, high shear mixers and fluidized beds.

* * * * *